(12) United States Patent
Polak et al.

(10) Patent No.: US 8,167,702 B2
(45) Date of Patent: May 1, 2012

(54) PREPAID WAGERING CARD

(75) Inventors: Willem Polak, Glen Echo, MD (US); Robert J. Potter, Alexandria, VA (US)

(73) Assignee: Lottofone, Inc., Alexandria, VA (US)

( * ) Notice: Subject to any disclaimer, the term of this patent is extended or adjusted under 35 U.S.C. 154(b) by 338 days.

(21) Appl. No.: 12/414,516

(22) Filed: Mar. 30, 2009

(65) Prior Publication Data

US 2009/0247257 A1    Oct. 1, 2009

Related U.S. Application Data

(63) Continuation of application No. 10/733,648, filed on Dec. 12, 2003.

(51) Int. Cl.
*A63F 13/00* (2006.01)

(52) U.S. Cl. .......................................................... 463/17

(58) Field of Classification Search .............. 463/16–19, 463/22, 25; 273/292, 293, 294, 296
See application file for complete search history.

(56) References Cited

U.S. PATENT DOCUMENTS

| | | | |
|---|---|---|---|
| 5,216,595 A | 6/1993 | Protheroe | |
| 5,657,899 A | 8/1997 | Stoken | |
| 6,146,272 A | 11/2000 | Walker et al. | |
| 6,203,011 B1 | 3/2001 | Nulph | |
| 6,251,017 B1 | 6/2001 | Leason et al. | |
| 6,305,687 B1 * | 10/2001 | Pollock et al. | 273/269 |
| 6,308,887 B1 * | 10/2001 | Korman et al. | 235/379 |
| 6,322,446 B1 | 11/2001 | Yacenda | |
| 6,325,716 B1 | 12/2001 | Walker et al. | |
| 2003/0036427 A1 | 2/2003 | Brandstetter et al. | |
| 2003/0092479 A1 * | 5/2003 | Weil et al. | 463/17 |
| 2004/0127279 A1 * | 7/2004 | Gatto et al. | 463/17 |

* cited by examiner

*Primary Examiner* — David L Lewis
*Assistant Examiner* — Eric M Thomas
(74) *Attorney, Agent, or Firm* — O'Brien Jones PLLC (57) ABSTRACT

A prepaid wagering card and a system and method for playing the lottery over a telephone line using the prepaid wagering card are provided. The prepaid wagering card includes information that makes it convenient to obtain the prepaid wagering card and use it to wager sets of numbers listed thereon, while also ensuring that the information remains secure. Participating in a lottery using the prepaid wagering card simply involves calling a wagering system from a telephone and providing requested information. Thus, a user can purchase a prepaid wagering card and decide on which scheduled lottery to actually wager using the prepaid wagering card.

20 Claims, 7 Drawing Sheets

PREPAID WAGERING CARD

This is a continuation of U.S. Non-Provisional patent application Ser. No. 10/733,648, filed Dec. 12, 2003, the entire disclosure of which is incorporated herein by reference.

BACKGROUND OF THE INVENTION

1. Field of the Invention

This invention relates generally to the field of lotteries and is consistent with a prepaid wagering card, as well as a system and method for playing the lottery over a telephone line using a prepaid wagering card.

2. Background and Related Art

A lottery involves a drawing in which prizes are distributed to the winners among persons buying a chance. Commonly, a lottery player is required to select a small set of numbers from a larger set of numbers. Thereafter, the lottery is "drawn" on a predetermined day by randomly selecting a small set of numbers from the larger set of numbers, wherein winners are determined based on the correspondence of their selected numbers to the drawn numbers. Winners are awarded prizes, most commonly in the form of cash prizes, which can greatly exceed the amount wagered by a winning player.

Thus, a lottery is a form of gambling and is often regulated at the State level. This gambling usually involves the selection of numbers in a predefined order that is consistent with the rules of each game. The gambling can also encompass a scratch game. A scratch game can involve, for example, scratching or rubbing off covered spots on a ticket, with a winning ticket being determined based on the matching or specified alignment of play symbols on the ticket.

Today, only retailers who register with a State's lottery can accept wagers and distribute scratch card games.

In general, there are three conventional ways for a customer to place a wager in a lottery.

First, a customer can go to an authorized retailer and purchase a scratch card game. The customer determines whether he or she has won by scratching the card and reading the results.

Second, a customer can go to an authorized retailer and provide a series of number to the retailer or ask for a "quick pick". The retailer, through a lottery-issued terminal, enters the numbers and provides a receipt for the wager, charging the customer the corresponding amount. In this case, the receipt will have a bar code that includes the play identification (PID), which is used by the lottery to identify a wager.

Third, a customer can apply for a subscription to the lottery in which the customer supplies the set of numbers to be played, the start date and the number of wagers to be played by filling out a form. These wagers are played sequentially until the amount of money supplied for the subscription is depleted.

Numerous disadvantages and problems arise in the context of the conventional approaches to participating in lotteries where the customer plays a set of numbers, i.e., the aforementioned second and third manners of placing wagers.

For example, the second approach requires a customer to visit an authorized retailer, provide a series of number to the retailer or ask for a "quick pick", and receive a receipt indicating entry in the next drawing.

Thus, only retailers with lottery-issued terminals can accept a wager from a customer, which in turn may require the customer to travel a great distance and/or make an additional "stop" just for the purpose of playing the lottery. This inconvenience can be increased by other factors such as bad weather, holiday crowds, "off hours"—e.g., when the retailer is not open for business, etc.

As a further inconvenience, a customer needs to visit the retailer each time they wish to place a wager. In general, when a wager is placed at a retailer, it is only for the next upcoming "drawing". Thus, if a customer is unable to reach an authorized retailer, for example because the customer is out of the State on business, the customer may be unable to place a wager for a desired lottery.

Furthermore, while a lottery may offer an "advance play" option wherein the customer can designate certain days to wager and a duration to wager those days, a customer is still unable to purchase the opportunity to wager but hold off on actually wagering, for example, until the jackpot level reaches their individual level of interest.

While the third approach, i.e., a subscription service, can remove the necessity of making frequent visits to the lottery retailer and can reduce the risk of being unable to place a desired wager, the subscription requires that the same set of numbers be played throughout the subscription.

The subscription approach is also inflexible in that the customer must play the wagers sequentially until the supplied amount of money is exhausted. Thus, a subscription does not allow the customer to "pick and choose" which games/drawings he or she desires to play.

SUMMARY OF THE INVENTION

The present invention overcomes the aforementioned inconvenience and inflexibility of the conventional approaches to placing a wager by providing a prepaid wagering card, as well as a system and a method for playing the lottery over a telephone line using a prepaid wagering card.

Accordingly, it is an exemplary aspect of the present invention to provide a prepaid wagering card such that lottery players can purchase the wagering card in advance and thereafter elect which games to play, e.g., on which days to play.

The prepaid wagering card can be wagered at the time of purchase as well. Thus, a user can wager with a purchased prepaid wagering card at the time of purchasing the prepaid wagering card, for example, in the same transaction, later decide on which scheduled lottery or lotteries to actually wager using the prepaid wagering card, or both, for example, in the case of a prepaid wagering card have multiple sets of playable numbers/entries.

The prepaid wagering card may further include a multitude of security mechanisms to protect the information contained thereon, as well as the integrity of any partnered lottery in general.

As another exemplary aspect of the present invention, non-traditional retailers of lottery instruments can offer the prepaid wagering card for sale, thereby increasing potential lottery revenues while also increasing the convenience to purchasers.

In yet another exemplary aspect of the present invention, a system and method are provided for interactively playing the lottery using the prepaid wagering card and a communications link, e.g., a telephone line. This further contributes to the convenience and flexibility of the present invention, for example, a player can participate in a lottery from the comfort of their own home using only a telephone.

The present invention satisfies the aforementioned exemplary objects and provides the aforementioned exemplary advantages. Herein various illustrative, non-limiting embodiments of the present invention are described.

For example, a prepaid wagering card is provided, comprising a first side and a second side; wherein one or more entries corresponding to a format of a predetermined lottery are printed on at least one of said first side and said second side, each entry including a plurality of random numbers; wherein activation information for activating said prepaid wagering card is printed on at least one of said first side and said second side; wherein activation of said prepaid wagering card using said activation information is a prerequisite to playing said one or more entries in said lottery; and wherein redemption information for redeeming said prepaid wagering card for a prize if any of said one more entries played in said lottery is determined to be a winning entry is printed on at least one of said first side and said second side.

Additionally, the present invention encompasses a method and a system for prepaid wagering.

Further objects, features and advantages of the present invention will become apparent from consideration of the following description and the appended claims when considered in connection with the accompanying drawings.

BRIEF DESCRIPTION OF THE DRAWING FIGURES

With specific reference now to the drawings in detail, it is stressed that the particulars shown are by way of example and for purposes of illustrative discussion of the exemplary embodiments of the present invention only, and are presented in the cause of providing what is believed to be the most useful and readily understood description of the principles and conceptual aspects of the invention. In the accompanying drawings.

DETAILED DESCRIPTION OF ILLUSTRATIVE EMBODIMENTS

The following is a detailed description of various illustrative, non-limiting embodiments of the present invention.

Figure 1:
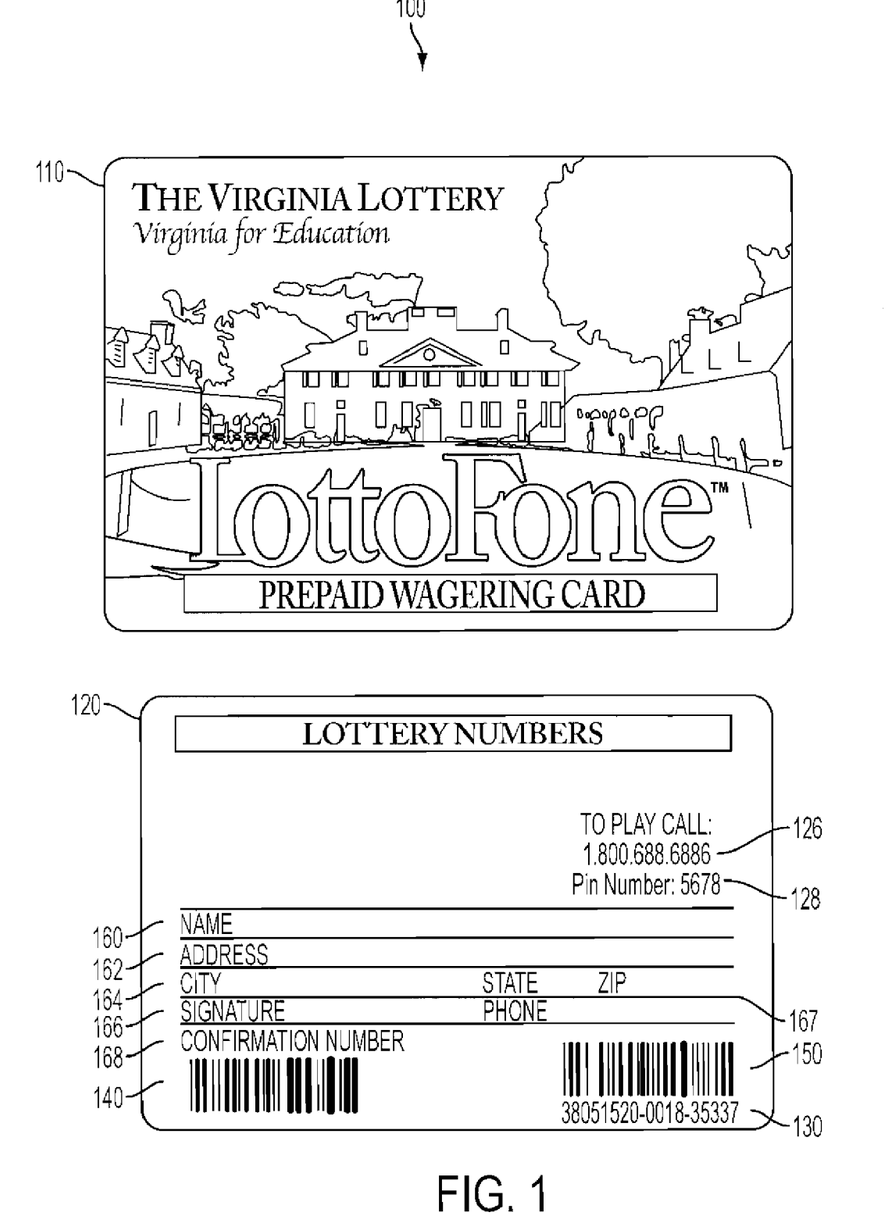
FIG. 1 illustrates an exemplary embodiment of a prepaid wagering card according to the present invention.

In FIG. 1, an exemplary embodiment of a prepaid wagering card according to the present invention is shown.

The prepaid wagering card 100 includes a first side 110 and a second side 120. The first side 110 can include promotional information. This is particularly beneficial in the context of non-traditional lottery retailers in that it allows these retailers to tie their products into the sale of the prepaid wagering cards. For example, a fast food chain might offer prepaid wagering cards for sale that include promotional information on one or more menu items.

The first side 110 can also include instructional information, such as information on which lottery the prepaid wagering card pertains to and how much the prepaid wagering card costs, as well as how to activate, play and redeem the prepaid wagering card. Furthermore, some or all of this instructional information can appear externally to the prepaid wagering card 100, for example, on packing containing the prepaid wagering card.

The second side 120 includes numerous items of information. For example, one or more random numbers may appear on the second side 120. These random numbers are associated with the particular prepaid wagering card 100 by a unique card identifier. For example, a combination of the card's PIN 128 and serial number 130 will serve to uniquely identify this particular prepaid wagering card 100.

The random numbers correspond to a format consistent with the lottery game for which the prepaid wagering card 100 is applicable. A group of these random numbers make up a wager number 122. In FIG. 1, a group of six random numbers make up each wager number 122. The random numbers are all generated prior to a request for a wager being made.

The second side 120 also optionally may include expiration information 124 alerting a player as to how long the player has to play the wager numbers 122 on the prepaid wagering card 100 before the card expires. This period of time starts from the date of activation, i.e., the date of purchase, of the prepaid wagering card 100. The prepaid wagering card 100 cannot be used to place a wager after the expiration of this time period.

The second side 120 may include contact information 126 on how to establish a communications session so as to play the wager numbers 122. For example, the contact information 126 can be a toll-free telephone number. Additionally, the contact information could be a toll number or a network address, e.g., an Internet address. Additional information on the second side 120 of the prepaid wagering card 100 may be required to complete the establishment of the communications session, e.g., a card PIN 128.

Furthermore, as noted above, the prepaid wagering card 100 includes a unique card identifier. For example, the combination of a card PIN 128 and a card serial number 130 may serve to uniquely identify a particular prepaid wagering card 100. Furthermore, the card serial number 130 can serve as a card control number. For example, the card serial number 130 can have information embedded therein, such as a date of manufacture of the card.

The second side 120 also may include regions for customer information to be recorded subsequent to purchasing the prepaid wagering card 100. For example, regions for recording a player's name 160, address 162 (including city, state and zip code 164), telephone number 167 and signature 166 are provided. Additionally, a region for recording a confirmation number 168 provided to a player upon successfully wagering the wager numbers 122 is provided on the prepaid wagering card 100.

Further still, the second side 120 may include activation information. The activation information is used to activate the prepaid wagering card 100.

The activation information may be in a machine-readable format. For example, the activation information may be in the form of a bar code 140, in the case of traditional lottery retailers. Thus, when purchased, a lottery terminal can read the activation information, thereby activating the prepaid wagering card 100.

Alternatively or additionally, the activation information may be in the form of a magnetic strip (not shown), in the case of non-traditional lottery retailers. Thus, when purchased, a point-of-sale (POS) terminal can read the activation information, thereby activating the prepaid wagering card 100. This ability to activate the prepaid wagering cards at non-traditional lottery retailers using the retailers' existing hardware opens up new distribution channels for participating lotteries and greatly increases customer convenience, for example, by providing customers with new sources for purchasing lottery entries.

The card serial number 130 can serve as redundant activation information. Thus, when purchased, the card serial number 130 can be entered at a sales terminal to activate the prepaid wagering card 100.

Activation of the prepaid wagering card 100, allows the wager numbers 122 on the card to be wagered, for example, along with activation of the prepaid wagering card 100 or at a later time of the cardholder's choosing. Indeed, activation of the prepaid wagering card is a prerequisite to wagering the wager numbers 122. Thus, the activation information provides a security component to the prepaid wagering card 100. For example, a card that is stolen before it is activated by a sales terminal would be useless.

Furthermore, if the prepaid wagering card is not wagered, or is only partially wagered, at the time of activation, activation of the prepaid wagering card 100 starts an expiration period that defines a period of time during which the wager numbers 122 of the prepaid wagering card 100 must be wagered. If this period of time lapses before the wager numbers 122 of the prepaid wagering card 100 are wagered, the prepaid wagering card 100 will expire.

Even further, the second side 120 includes redemption information. The redemption information is used when redeeming a winning wagering card. Depending on the rules of the lottery, the prepaid wagering card 100 itself may serve as a "bearer" instrument for claiming prizes. Additionally, the claiming of any due prizes may be limited to a predetermined period of time (e.g., 180 days); otherwise, if unclaimed, the prizes will be forfeited.

What constitutes a "winning" card depends on the rules of the lottery game for which the prepaid wagering card 100 is applicable. For example, a wagering card may be considered a "winner" if it was used to wager a wager number 122 that corresponds to a drawn series of numbers in the applicable lottery, e.g., the Virginia Lottery.

The redemption information may be in a machine-readable format. For example, the redemption information may be in the form of a bar code 150 or a magnetic strip (not shown) on the prepaid wagering card 100.

The status of a wagering card to be redeemed can be determined by reading and processing the redemption information. By separating the redemption information from the activation information, additional security is provided. For example, a wagering card that has not yet been activated cannot be wagered, and consequently cannot be redeemed. Additionally, the prepaid wagering card 100 can be packaged in such a manner that only the activation information (and not the redemption information) is visible/accessible prior to unpacking the prepaid wagering card 100. Consequently, the copying of redemption information is discouraged, for example, by a clerk with access to the lottery terminal/POS system.

For additional security, the activation information and the redemption information can be encrypted, thus requiring decryption (e.g., by an authorized terminal, process, etc.) prior to any processing of the activation information and the redemption information.

Of course, the information described above can appear on the opposite side 110 or 120 of the prepaid wagering card 100, or even both sides 110 and 120. Furthermore, the information described above can be provided in many different languages, either on the same card or on different card versions.

Additional information relating to the wagering card itself or its applicable lottery can be included on the prepaid wagering card and/or its packaging. For example, such additional information may include any limits of liability, contact information for gambler's anonymous, pertinent claim information for the player, etc.

Figure 2:
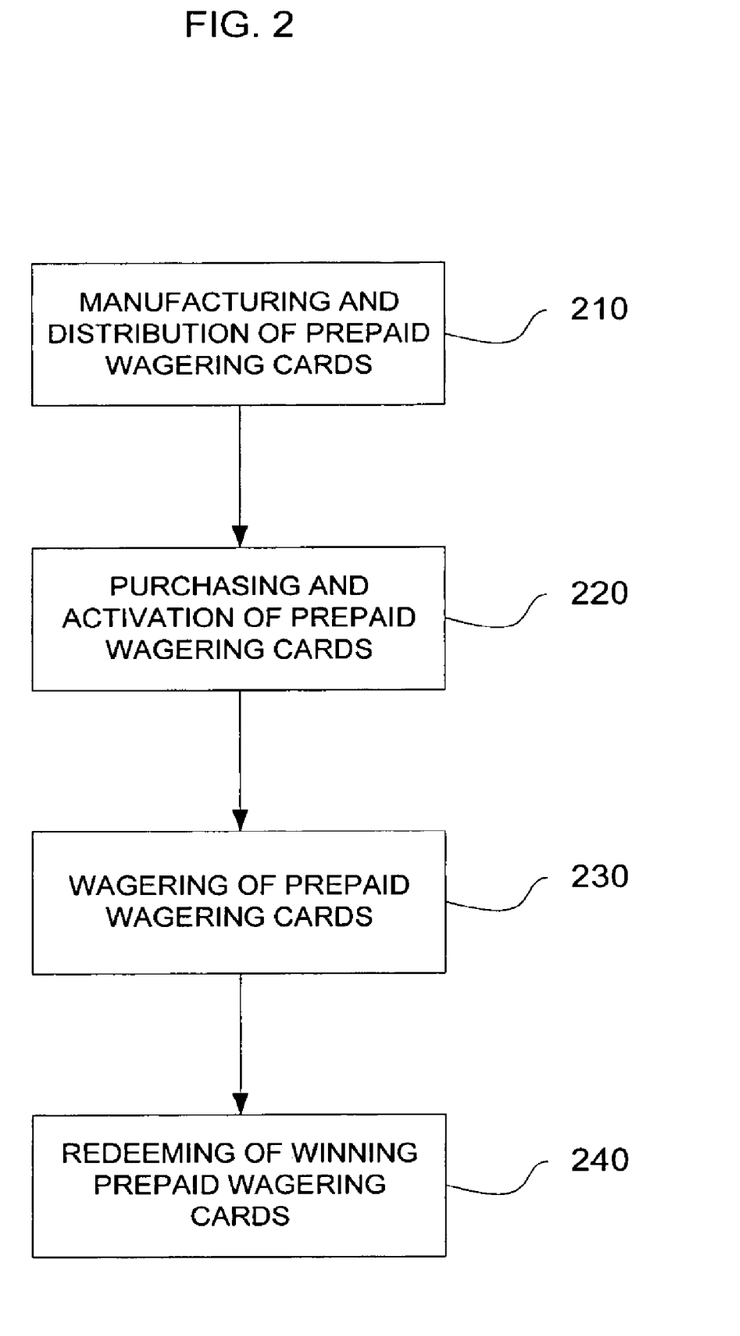
FIG. 2 illustrates an exemplary lifecycle of the prepaid wagering card illustrated in FIG. 1.

In FIG. 2, an exemplary lifecycle of prepaid wagering cards (e.g., the prepaid wagering card 100 of FIG. 1) is illustrated.

First, a plurality of prepaid wagering cards are manufactured and distributed (step 210). As noted above, each of these prepaid wagering cards can include tracking information such as a date and location that a particular wagering card was manufactured. Additionally, as noted below, other information on the card can be used to track a particular wagering card at various stages, for example, activation and redemption. Indeed, the complete lifecycle of a particular wagering card can be tracked. At this stage, the cards can be considered to exist in a valid but non-activated state, i.e., dormant state.

During the manufacturing of the prepaid wagering cards (step 210), various information, e.g., as discussed in relation to FIG. 1, is provided on the wagering cards. Additionally, this information may also be stored in a database for use by systems that interface with the prepaid wagering cards. The cards, and their associated information, can be logically grouped. For example, cards can be processed and packaged based on a card, a set, a batch, a box, etc. The state of the cards is "packaged".

After manufacturing, the prepaid wagering cards are distributed (step 210). For example, the wagering cards can be distributed to a contracting lottery, which in turn distributes the wagering cards to authorized retailers. Given the features of these wagering cards, the authorized retailers can include non-traditional lottery retailers such as video stores, hardware stores, coffee shops, restaurants including fast food chains, drug stores, department stores, etc. Alternatively or additionally, the prepaid wagering cards could be distributed directly to the retailers. At this stage, the state of the cards is "sent".

Next, when the distributed wagering cards arrive at their destinations, the state of the cards is "received". The prepaid wagering cards are then ready to be purchased, which in turn activates them (step 220). A traditional lottery retailer may have dedicated equipment for interfacing with the prepaid wagering cards and reading information thereon, for example, in the form of a bar code. A non-traditional lottery retailer can use non-dedicated equipment, for example an existing point-of-sale (POS) terminal, to read information thereon. Activation information on the wagering cards can be stored in various formats, for example a magnetic strip, to facilitate interfacing with the non-dedicated reading equipment of non-traditional lottery retailers. Additionally, a purchaser of a prepaid wagering card can be provided with a (hardcopy) receipt of purchase to further verify activation of their wagering card. The state of a purchased card is "activated".

Once purchased and thus activated (step 220), the prepaid wagering cards can be used to interface with a prepaid wagering system over a telephone line in order to wager the wager numbers on the prepaid wagering cards (step 230). For example, a customer can dial a toll-free telephone number, thereby establishing a connection with the prepaid wagering system. Information on the wagering card and the customer are provided over the connection to the prepaid wagering system. For example, the prepaid wagering system can include an interactive voice response (IVR) component that prompts the customer for the necessary information. The state of the card at this point is considered to be "live". Upon receipt of the information, the prepaid wagering system provides confirmation information to the customer via the connection. This confirmation information indicates that a wager using the prepaid wagering card was successfully completed. Thereafter, the connection can be disconnected. The state of the card at this point is "played".

If a prepaid wagering card is not wagered within a predetermined (indicated) time period, the wagering card will expire. Thereafter, the prepaid wagering card cannot be used for any wagering.

Alternatively, steps 220 and 230 can be combined, for example, in a case that a customer chooses to wager the prepaid wagering card at the time of purchase (i.e., activation).

If a wager placed with the prepaid wagering card turns out to be a winning wager, the card can be redeemed for a prize such as a cash payment (step 240). The prepaid wagering card itself can serve as a "bearer instrument" to be redeemed for the appropriate prize.

Figure 3:
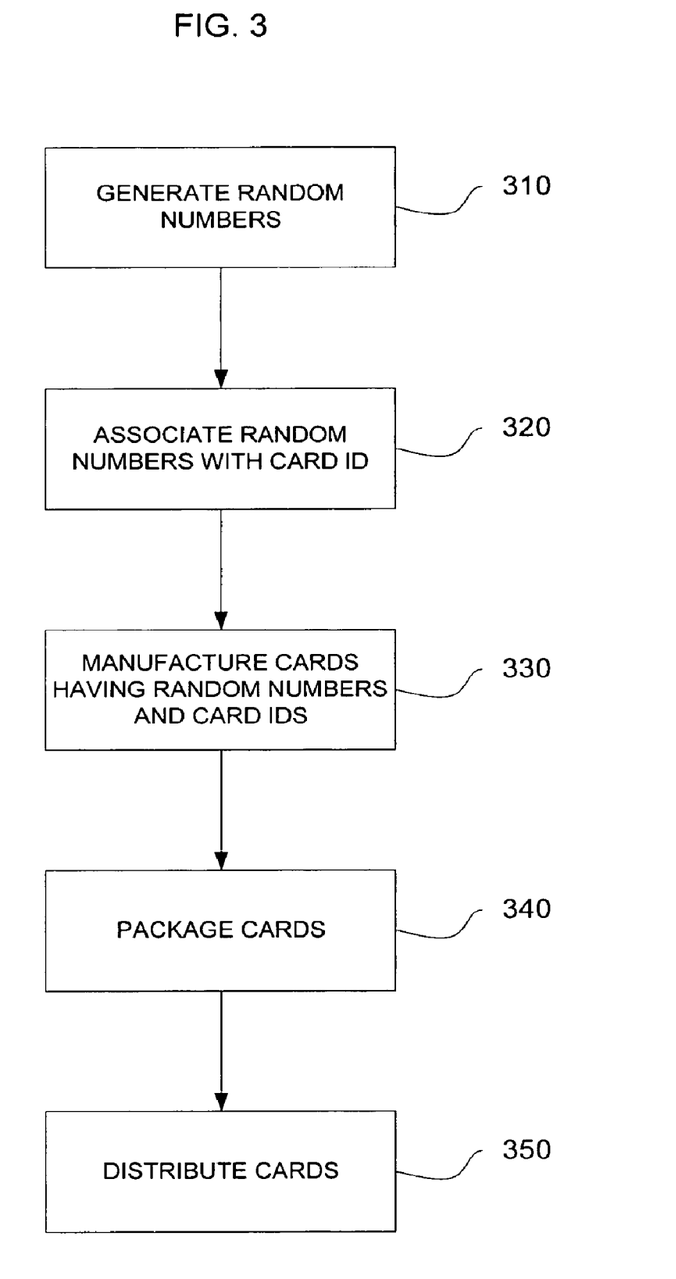
FIG. 3 is a flowchart illustrating the manufacturing and distribution of prepaid wagering cards.

FIG. 3 illustrates the steps of manufacturing and distributing the prepaid wagering cards.

In step 310, random numbers are generated. A range of the numbers that are randomly generated corresponds to the range of numbers used in a lottery of interest. For example, the generated random numbers could range from 1 to 52, inclusive. Thereafter, the generated random numbers are associated with card identification numbers, which will be used to uniquely identify the prepaid wagering cards (step 320). This relationship between the card identification number and the generated random numbers associated therewith can be represented in a data store, for example, a relational database. Additionally, other information relating to the card identification numbers and/or generated random numbers, for example information indicating a particular lottery for which the generated numbers are to be used, can also be stored in the data store.

Furthermore, the quantity of generated random numbers that are associated with a card identification number determines how many "plays"/"wagers" are associated with the card identification number.

In step 330, prepaid wagering cards are manufactured, wherein each card includes a single card identification number and those generated random numbers associated with the card identification number. The card identification number can be printed on the card in machine-readable form, as plain text or in both formats. Furthermore, as an added security measure, the card identification number can be encrypted.

Once manufactured, the cards are packaged in step 340. For example, cards are organized into batches which are then collected and placed in a box. Batch and box identification numbers allow additional tracking of the cards during their distribution to store shelves (step 350). As noted above, the wagering cards can be distributed to a contracting lottery, which in turn distributes the wagering cards to authorized retailers, or the wagering cards can be distributed directly to the retailers.

Figure 4:
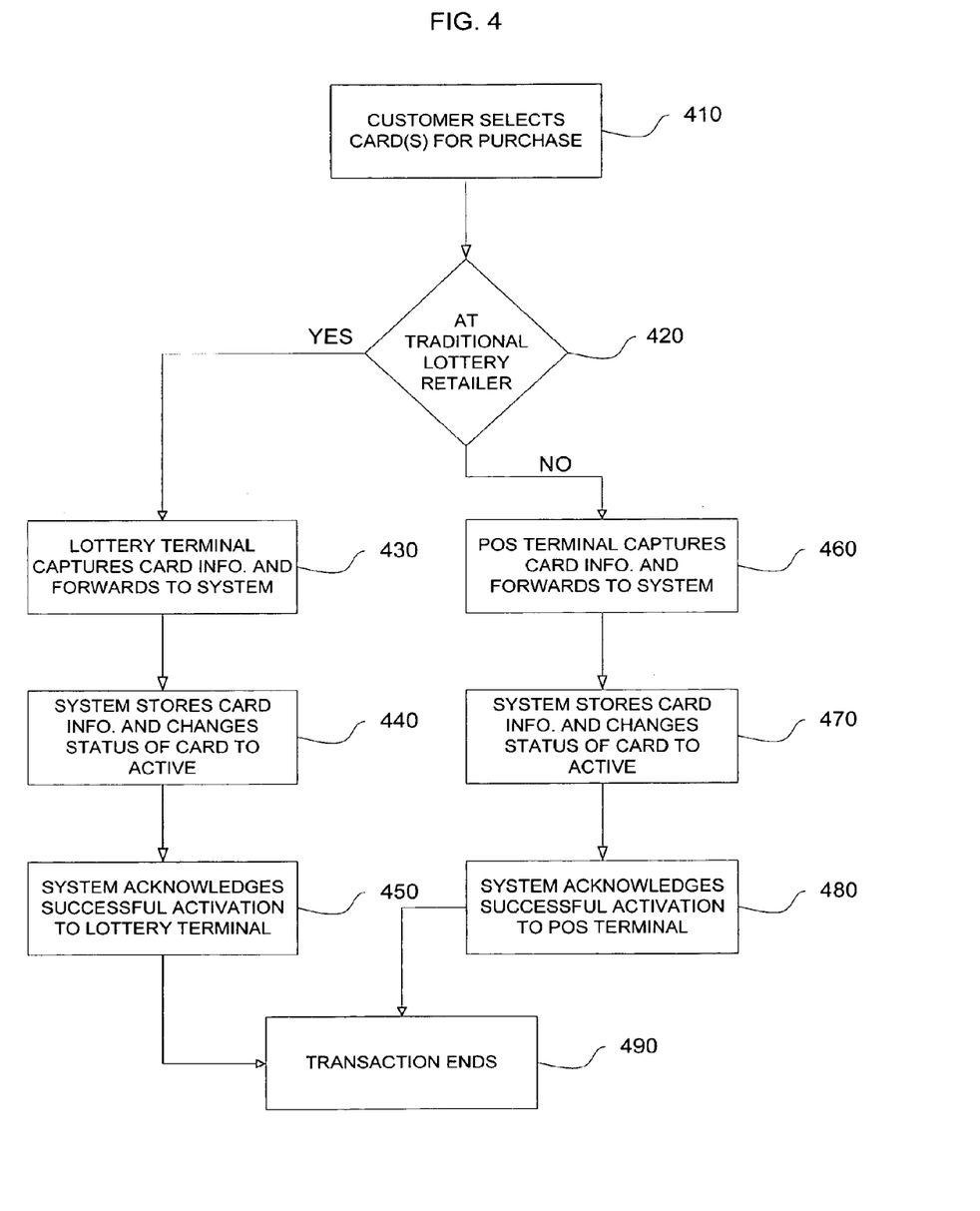
FIG. 4 is a flowchart illustrating an exemplary method for purchasing and activating prepaid wagering cards.

Once the prepaid wagering cards are received by the retailers, the cards are displayed for sale. FIG. 4 illustrates an exemplary method for purchasing and activating the prepaid wagering cards. In step 410, a customer selects one or more wagering cards or sets of wagering cards to purchase.

If purchased at a traditional lottery retailer (YES in step 420), i.e., a lottery-authorized retailer having a lottery-specific terminal, a lottery front end system receives card information, e.g., a card identification number, captured by the dedicated lottery terminal and forwards it to the prepaid wagering system for storage/processing (steps 430 and 440). Thereafter, the prepaid wagering system acknowledges successful activation of the wagering card to the lottery front end system (step 450) and the transaction ends (step 490).

If purchased at a non-traditional lottery retailer (NO in step 420), i.e., a retailer not employing a lottery-specific terminal, a non-dedicated terminal such as a POS terminal captures card information, e.g., a card identification number, and forwards it to the prepaid wagering system for storage/processing (steps 460 and 470). Thereafter, the prepaid wagering system acknowledges successful activation of the wagering card to the POS terminal/system (step 480) and the transaction ends (step 490).

Thus, at this point, a prepaid wagering card purchased by the customer is activated and may be wagered at the customer's convenience. Preferably, but not necessarily, the wagering card can provide a period of time during which it can be validly wagered, for example, one year. This period of time would run from the date of activation of the card, i.e., the date it was purchased. Failure to play the card within this period would result in the card expiring, thus becoming unplayable.

Furthermore, as noted above, the purchased prepaid wagering card can be activated and wagered in the same transaction, at either a traditional lottery retailer or a non-traditional lottery retailer, for example, by forwarding captured wagering data to a lottery host.

Figure 5:
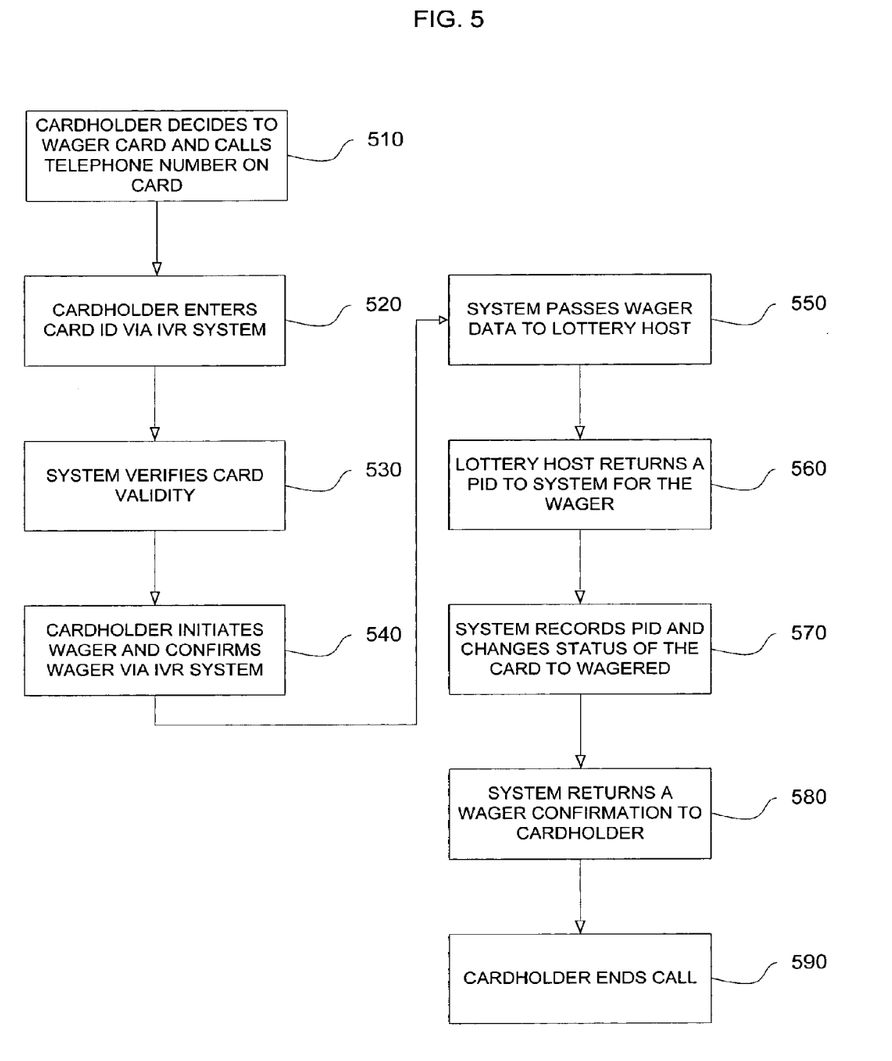
FIG. 5 is a flowchart illustrating an exemplary method for wagering a prepaid wagering card.

FIG. 5 illustrates an exemplary method for wagering a prepaid wagering card at an arbitrary time after the prepaid wagering card is purchased.

In FIG. 5, the cardholder elects to wager the card on the next upcoming drawing and establishes a communications session with a dedicated system for processing wagers made using a prepaid wagering card, for example by dialing a designated telephone number (step 510). Preferably, but not necessarily, the telephone number will be designated on the wagering card itself. Furthermore, the designated telephone number will preferably, but not necessarily, be a toll-free telephone number. The wagering cardholder could be the person who purchased the card or someone else, e.g., having received the card as a gift.

Once the call is connected, the cardholder enters the card identification number, for example, via an interactive voice response (IVR) system (step 520). For example, the IVR system would prompt the cardholder for the card identification number and then receive the requested information spoken by the cardholder or keyed in from the cardholder's telephone keys.

Furthermore, since the prepaid wagering cards may be available in many different languages, the IVR system could prompt the player for card information in a language corresponding to the language associated with the prepaid wagering card. Alternatively, the player could specify a language in which to receive instructions/prompts from the dedicated system.

The prepaid wagering system then verifies the validity of the prepaid wagering card corresponding to the received card identification number (step 530). For example, the prepaid wagering system would verify that the card has been activated and has not expired.

Once the validity of the card has been established, the IVR system invites the cardholder to wager the card. For example, the cardholder enters an authorization code from the card via the IVR system and then confirms the wager via the IVR system (step 540). Preferably, but not necessarily, the IVR system will prompt the cardholder to confirm the wager, e.g., "please press '1' to confirm".

Thereafter, the prepaid wagering system passes the wager data, e.g., the numbers to be wagered, to a lottery host (step 550). The lottery host receives the wager date and returns a play identification (PID) to the prepaid wagering system (step 560). The prepaid wagering system records the PID (step 570). Upon providing this confirmation, the state of the card is "wagered". If the cardholder's wager was successfully received and processed, the cardholder is informed of such by receiving confirmation information from the prepaid wagering system (step 580), after which the cardholder can end the call (step 590).

The wager will be resolved by the next upcoming drawing. If the wager ends up being a "winning" wager, the cardholder can redeem the card for a prize, for example, a cash payment. Conversely, if the wager is not a "winning" wager, the cardholder can dispose of the card. Alternatively, the card may still be usable if other "sets" of numbers remain to be wagered. Additionally, the card may continue to have value, for example through joint promotion. For example, through a partnership with a fast food chain, used prepaid wagering cards can be redeemed for a discount off the cost of one or more products of the fast food chain. Furthermore, the cardholder can wager additional cards that were previously purchased or can go purchase additional cards to wager in the future.

Figure 6:
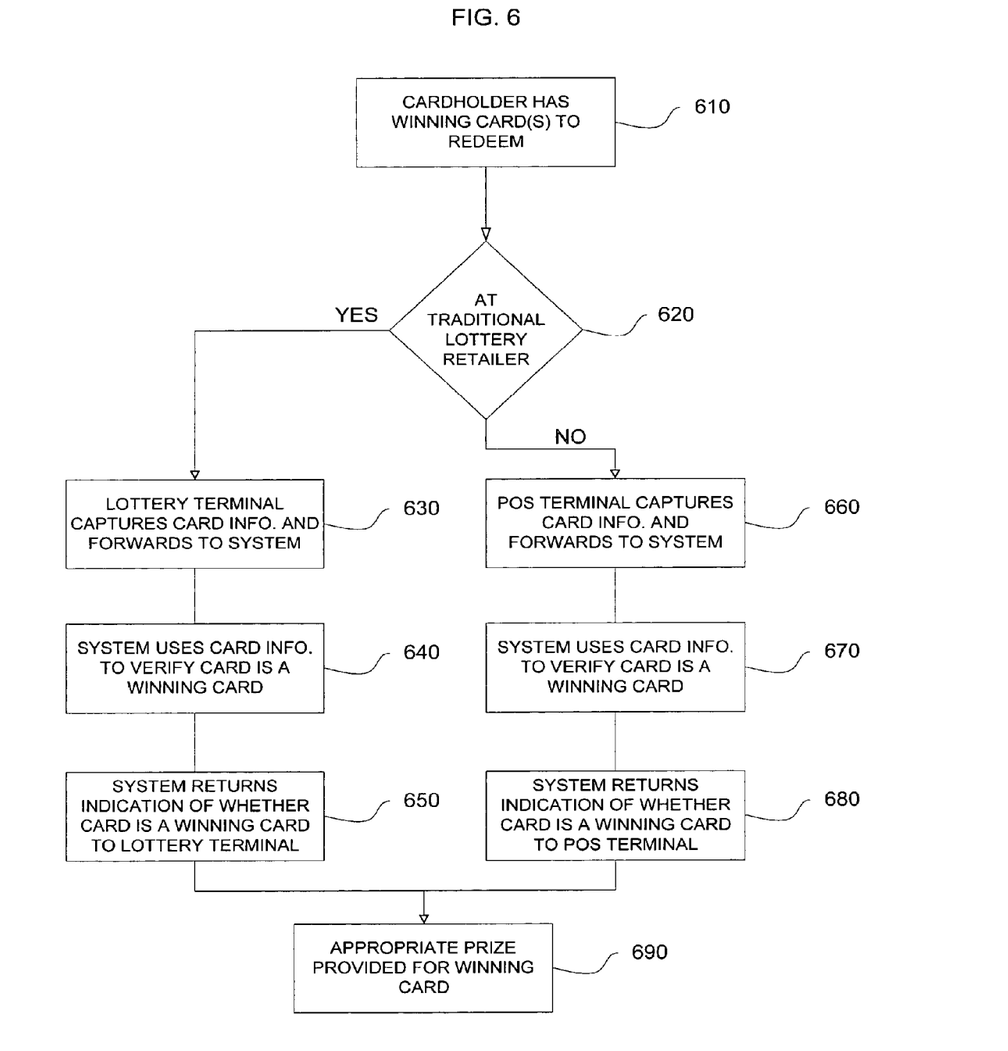
FIG. 6 is a flowchart illustrating an exemplary method for redeeming prepaid wagering cards.

FIG. 6 illustrates an exemplary method for redeeming prepaid wagering cards.

In FIG. 6, a cardholder has one or more wagered cards, which resulted in a lottery win, to redeem for a prize (step 610). If the cardholder decides to redeem the card at a traditional lottery retailer, i.e., a lottery-authorized retailer having a lottery-specific terminal (YES in step 620), card information for the card is captured by the dedicated lottery terminal and forwarded to the prepaid wagering system (step 630). The prepaid wagering system uses the card information, e.g., a card identification number, to verify that the card is a winning card (step 640). This verification can include determining whether a winning card has been redeemed within a predetermined allotted period of time.

Next, the prepaid wagering system returns information indicating whether the card being redeemed is a winning card to the lottery terminal (step 650). Thus, an operator of the lottery terminal receives confirmation as to whether a card is a winning card and if so, can provide an appropriate prize to the cardholder (step 690).

Alternatively, if the cardholder decides to redeem the card a non-traditional lottery retailer, i.e., a retailer not employing a lottery-specific terminal (NO in step 620), a non-dedicated terminal such as a POS terminal captures card information, e.g., a card identification number, and forwards it to the prepaid wagering system for processing (step 660). The prepaid wagering system uses the card information to verify that the card is a winning card (step 670). This verification can include determining whether a winning card has been redeemed within a predetermined allotted period of time.

Next, the prepaid wagering system returns information indicating whether the card being redeemed is a winning card to the POS terminal (step 680). Thus, an operator of the POS terminal receives confirmation as to whether a card is a winning card and if so, can provide an appropriate prize to the cardholder (step 690).

The aforementioned exemplary redemption method provides added convenience to cardholders by increasing the available venues for redeeming winning cards.

Figure 7:
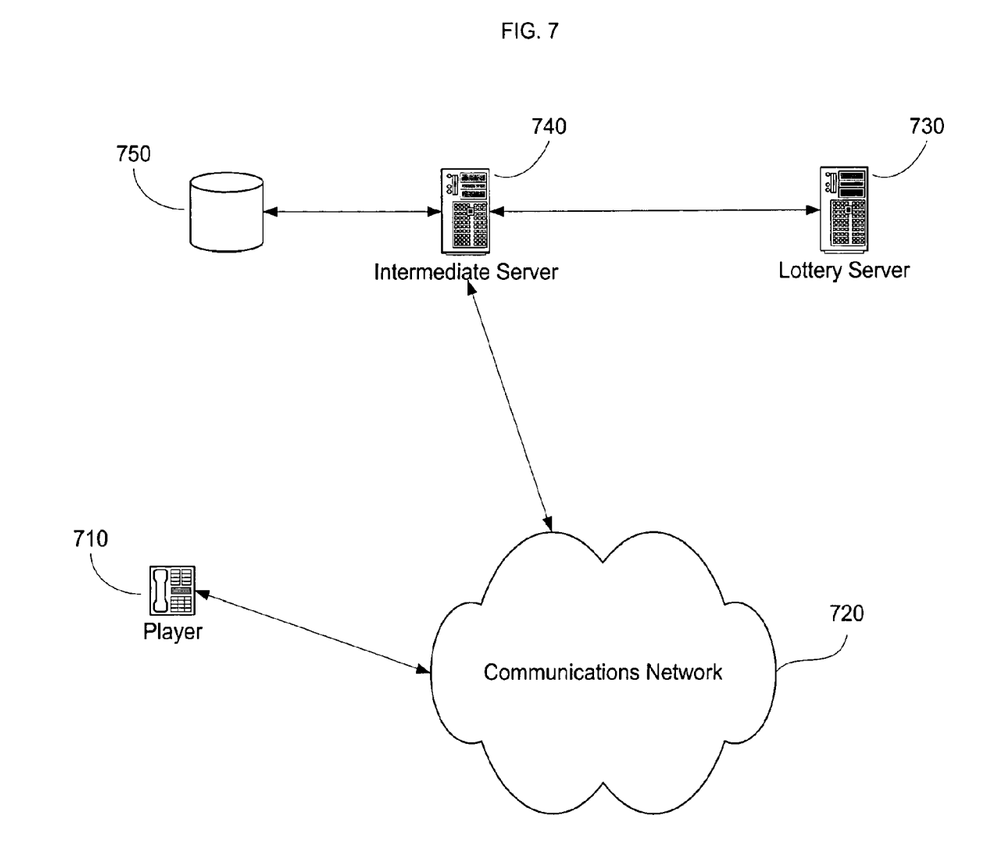
FIG. 7 illustrates an exemplary system for prepaid wagering according to the present invention.

Finally, FIG. 7 illustrates an exemplary system, according to the present invention, for wagering. a prepaid wagering card at an arbitrary time after the prepaid wagering card is purchased.

The system includes a communications device 710 used by a player to establish a communications session with an intermediate server 740 via a communications network 720. The intermediate server 740 includes a database 750, and the intermediate server 740 can communicate with a lottery server 730, for example, via the communications network 720.

The communications device 710 can be a telephone, including portable and cellular phones. Accordingly, the communications network 720 can be a public switched telephone network (PSTN) or a wireless communications network.

Another exemplary communications device 710 is a personal computer capable of interfacing with the intermediate server 740 via the communications network 720. In this case, the communications network can be the Internet or a wide area network (WAN).

Using a prepaid wagering card (as illustrated in FIG. 1), a player can use the communications device 710 to provide information to an intermediate server 740 via the communications network 720. Indeed, the intermediate server 740 can include an interactive voice response (IVR) component (not shown) that prompts the player for any necessary information.

Thereafter, the intermediate server 740 accesses its database 750 to retrieve any additional needed information based on the information provided by the player. In this manner, the player is able to place a wager for an upcoming lottery via their communications device 710. Having obtained all of the information needed to place the wager, the intermediate server 740 provides the player with confirmation information via the communications network 720 and the player's communications device 710 that confirms the player's wager was successfully placed. Additionally, the intermediate server 740 forwards the appropriate wager information, including the sets of random numbers to be wagered, to a lottery server 730 for registration of the wager therein. The lottery server 730 then registers the sets of random numbers in the next scheduled drawing.

Furthermore, at least one of the intermediate server 740 and the lottery server 730 are able to communicate with retail servers to poll for information on sold prepaid wagering cards. When a prepaid wagering card is sold, its status in the system becomes "active". For example, the intermediate server 740 can stored information in its database 750 indicating that a sold prepaid wagering card has been activated.

Even further, the system is also able to track the card from production through redemption. For example, an electronic trail/record is kept in the database 750 of the intermediate server 740 and updated appropriately. The system can also use information from the communications session in updating the electronic trail record. For example, an automatic number identification (ANI) function can be used to store a calling number from which a player is placing a wager.

It will be appreciated by persons skilled in the art that the present invention is not limited to what has been particularly shown and described hereinabove. Rather the scope of the present invention is defined by the append claims and changes may be made in the form, construction, procedure and arrangement of its various steps and elements without departing from its spirit or scope.

We claim:

1. A method for facilitating wagering with a prepaid card system comprising:
   providing a prepaid card including card information comprising
   wagering information configured to facilitate a wager,
   identification information configured to facilitate identification of the prepaid wagering card, activation information configured to facilitate electronic activation of the prepaid wagering card, and redemption information separate from the activation information and configured to facilitate redemption of a prize if the prepaid card is a winning card;

registering the identification information of the prepaid card when the prepaid card is purchased at a traditional lottery retailer having a dedicated lottery sales terminal or at a non-traditional lottery retailer having a non-dedicated lottery sales terminal, the dedicated lottery sales terminal being dedicated equipment configured to interface only with the prepaid wagering cards and read information thereon, the non-dedicated lottery sales terminal being non-dedicated equipment configured to interface with more than only the prepaid wagering cards and read information thereon, wherein the non-traditional lottery retailer facilitates a sale of a non-lottery product without a communication interface with the traditional lottery retailer;

activating the prepaid card when a prepaid wagering system electronically receives the activation information of the prepaid card; and determining whether the prepaid card is being activated at the traditional lottery retailer or at the non-traditional lottery retailer, wherein, if the prepaid card is being activated at the traditional lottery retailer, the dedicated lottery sales terminal reads the card information and forwards the card information to the prepaid wagering system, which updates the card information to a database and sends an acknowledgement to the lottery sales terminal indicating that the prepaid card is activated, and wherein, if the prepaid card is being activated at the non-traditional lottery retailer, the non-dedicated lottery sales terminal reads the card information and forwards the card information to the prepaid wagering system, which updates the card information to the database and sends an acknowledgement to the non-dedicated lottery sales terminal indicating that the prepaid wagering card is activated, and wherein the activation information is stored as a bar code readable by the dedicated lottery sales terminal and as a magnetic strip readable by the non-dedicated lottery sales terminal.

2. The method of claim 1, further comprising interfacing with a lottery host to exchange at least some of the card information with the lottery host.

3. The method of claim 2, further comprising exchanging numbers to be wagered and a wager date with the lottery host.

4. The method of claim 3, further comprising receiving a play identification from the lottery host after exchanging numbers to be wagered and a wager date with the lottery host.

5. The method of claim 4, further comprising storing the play identification, numbers to be wagered, and a wager date in the prepaid wagering system database.

6. The method of claim 3, wherein the card continues to have value after exchanging numbers to be wagered and a wager date with the lottery host.

7. The method of claim 1, further comprising providing redemption information that is separate from the activation information.

8. The method of claim 1, further comprising recording customer information in the database subsequent to purchasing the prepaid card.

9. The method of claim 1, further comprising tracking the lifecycle of the prepaid card.

10. The method of claim 1, further comprising interfacing with a holder of the prepaid card.

11. The method of claim 1, wherein interfacing with the holder of the prepaid card includes providing an interactive voice response component prompting facilitating an exchange of information with the holder of the prepaid card.

12. The method of claim 2, further comprising polling among the prepaid wagering system, the lottery host, one or more dedicated lottery sales terminals, and one or more non-dedicated lottery sales terminals to gather information on purchased prepaid cards.

13. The method of claim 1, further comprising: if the prepaid card is being activated at the traditional lottery retailer, the prepaid wagering system stores first sales information on a sales transaction of the prepaid card in the database; and if the prepaid wagering card is being activated at the non-traditional lottery retailer, the prepaid wagering system stores second sales information on a sales transaction of the prepaid card in the database.

14. The method of claim 13, wherein the first sales information and the second sales information are the same.

15. The method of claim 13, wherein the first sales information includes at least one of a time the prepaid card was sold, a date the prepaid card was sold, and information uniquely identifying a location at which the prepaid card was sold.

16. The method of claim 13, wherein the second sales information includes at least one of a time the prepaid card was sold, a date the prepaid card was sold, and information uniquely identifying a location at which the prepaid card was sold.

17. The method of claim 1, wherein the non-dedicated lottery sales terminal is a point-of-sale (POS) terminal.

18. The method of claim 1, comprising:
establishing a first communications link between a cardholder and the prepaid wagering system;
submitting card information on the prepaid card to be wagered to the prepaid wagering system via the first communications link;
verifying the validity of the prepaid card;
if the validity of the prepaid card is verified:
submitting first wager data to the prepaid wagering system via the first communications link;
transmitting the first wager data from the prepaid wagering system to a lottery system via a second communications link established between the prepaid wagering system and the lottery system;
registering one or more entries included in the first wager data for a scheduled lottery drawing;
transmitting second wager data from the lottery system to the prepaid wagering system via the second communications link;
storing the second wager data in the database; and
transmitting a wager confirmation from the prepaid wagering system to the cardholder via the first communications link.

19. The method of claim 18, wherein said first communications link and said second communications link are the same.

20. The method of claim 18, comprising:
determining whether a prepaid card is being redeemed at the traditional lottery retailer or the non-traditional lottery retailer;
if the prepaid card is being redeemed at the traditional lottery retailer:

the dedicated lottery sales terminal reads card information on the prepaid card to be redeemed and forwards the card information to the prepaid wagering system;

the prepaid wagering system uses the card information to update the information for the prepaid card in the database; and the prepaid wagering system sends redemption information to the dedicated lottery sales terminal indicating whether the prepaid card is a winning card;

if the prepaid card is being redeemed at the non-traditional lottery retailer:

the non-dedicated sales terminal reads card information on the prepaid card to be redeemed and forwards the card information to the prepaid wagering system;

the prepaid wagering system uses the card information to update the information for the prepaid card in the database; and the prepaid wagering system sends redemption information to the non-dedicated sales terminal indicating whether the prepaid card is a winning card.

* * * * *